United States Patent [19]

Satoh et al.

[11] Patent Number: 4,978,981
[45] Date of Patent: Dec. 18, 1990

[54] EXPOSURE CONTROL DEVICE

[75] Inventors: Osamu Satoh; Isamu Hirai; Masahiro Nakata, all of Tokyo, Japan

[73] Assignee: Asahi Kogaku Kogyo Kabushiki Kaisha, Tokyo, Japan

[21] Appl. No.: 342,887

[22] Filed: Apr. 25, 1989

[30] Foreign Application Priority Data

Apr. 25, 1988 [JP] Japan ................................ 63-101659
Apr. 25, 1988 [JP] Japan ................................ 63-101660
May 24, 1988 [JP] Japan ................................ 63-126855

[51] Int. Cl.⁵ .......................... G03B 7/00; G03B 1/18; G03B 7/08
[52] U.S. Cl. ................................ 354/410; 354/195.12; 354/442; 354/455
[58] Field of Search ............... 354/410, 216, 455, 425, 354/426, 427, 195.1, 195.11, 195.12, 442

[56] References Cited

U.S. PATENT DOCUMENTS

| 4,103,307 | 7/1978 | Shinoda et al. | 354/412 |
|---|---|---|---|
| 4,320,944 | 3/1982 | Nakai | 354/443 |
| 4,329,029 | 5/1982 | Haskell | 354/443 |
| 4,503,325 | 3/1985 | Araki | 250/204 |
| 4,708,454 | 11/1987 | Kodaira et al. | 354/422 |
| 4,733,258 | 3/1988 | Kojima | 354/286 |
| 4,769,668 | 9/1988 | Ishikawa et al. | 354/442 |
| 4,803,509 | 2/1989 | Nakai et al. | 354/410 |

FOREIGN PATENT DOCUMENTS 60-242436 12/1985 Japan .
60-242437 12/1985 Japan .
60-242438 12/1985 Japan .
60-242439 12/1985 Japan .
62-201420 9/1987 Japan .

OTHER PUBLICATIONS

Shasin Kogyo, Apr. 1985, pp. 80-92, "New Type Camera".
Shasin Kogyo, Dec. 1986, pp. 82-90.
Shasin Kogyo, May 1987, pp. 84-100, "Camera Test".
Shasin Kogyo, Aug. 1987, pp. 83-93, "Camera Test".
Minolta Techno. Report, 1986, pp. 74-77.

Primary Examiner—L. T. Hix
Assistant Examiner—Cassandra C. Spyrou
Attorney, Agent, or Firm—Sandler, Greenblum & Bernstein

[57] ABSTRACT

An exposure control device of a camera by which an appropriate camera-shake limit shutter speed $T_{vf}$ can be obtained in accordance with a focal length f of a photographing lens, and by which an arbitrary program can be set on the basis of the shutter speed $T_{vf}$, in which $T_{vf}$ is obtained by an equation:

$$T_{vf} = \log_2 f,$$

or $$T_{vf} = (\log_2 f) \cdot \alpha + \beta;$$

wherein $\alpha < 1$, and $\alpha$ and $\beta$ are constants which satisfy $\log_2 f_o = (\log_2 f_o) \cdot \alpha + \beta$ for a predetermined arbitrary focal length $f_o$.

19 Claims, 14 Drawing Sheets

EXPOSURE CONTROL DEVICE

BACKGROUND OF THE INVENTION

1. Field of the Invention

The present invention relates to a programmed automatic exposure control device, especially to an exposure device by which the effect of camera-shake is obviated so that a better quality image is obtained.

2. Description of the Related Art

To make it easier to take good photographs, many cameras today are provided with a programmed automatic exposure control device (hereinafter abbreviated as exposure control device) by which, according to a luminance of an object to be photographed, an aperture and a shutter speed are combined to automatically provide a correct exposure. A conventional exposure control device provided in an interchangeable lens camera is briefly explained as follows.

The prior art exposure control device has a plurality of program diagrams by which an aperture and a shutter speed are combined to obtain an appropriate exposure. FIG. 4 shows examples of three kinds of program diagrams, $P_1$, $P_2$, and $P_3$. In FIG. 4, the vertical axis shows an $A_v$ value (aperture value), the lateral axis shows a $T_v$ value (shutter speed), and the oblique lines show equivalent exposure values.

In FIG. 4, if the program diagram $P_2$ is taken as a standard, the program diagram $P_1$ shows a line by which a photograph can be taken under a condition in which the shutter speed is raised at the same object luminance, and the program diagram $P_3$ shows a line by which a photograph can be taken under a condition in which an aperture is stopped down at the same object luminance.

In the prior art, a program diagram used for exposure control is chosen from among the program diagrams shown in the drawing, according to the focal length of the interchangeable lens (a photographing lens) used for the photographing, and where a zoom lens is used in accordance with focal length changes caused by a rotation of the zoom barrel. Namely, in the prior art, since a program diagram is not provided for each photographing lens having a different focal length, in all cases in which a focal length of the photographing lens is longer than a predetermined value $f_1$, the program diagram $P_1$ is used, and in all cases in which a focal length of the photographing lens is shorter than $f_2$ (wherein $f_2 < f_1$), the program diagram $P_3$ is used; in all the other cases, the program diagram $P_2$ is used.

In the case of camera-shake, however, it is considered that this has very little effect at a shutter speed which is higher than a camera-shake limit speed value determined by a reciprocal number of a focal length of the photographing lens, wherein a dimension is ignored; i.e., the shutter speed is 1/50 sec when the focal length $f = 50$ mm. With regard to this point, a conventional exposure control device does not have program diagrams for all photographing lenses having different focal lengths, but instead, a photographing condition is divided into zones according to a focal length, and program diagrams are allocated to each zone. Therefore, a point at which a shutter speed is lowest on the program diagram (a starting shutter speed; points shown by $T_{v1}$, $T_{v2}$, and $T_{v3}$ in FIG. 4) is necessarily a common value, for example, of a plurality of photographing lens for which the program diagram is applied, and accordingly, the full ability of each photographing lens may not be properly utilized. Further, in the conventional program diagram, both the $A_v$ value and $T_v$ value change in accordance with a lowest starting shutter speed (called $T_{vf}$) used as a starting point.

SUMMARY OF THE INVENTION

The present invention is intended to solve the above problem, and therefore, the object of the present invention is to provide an exposure control device in which, not only is an appropriate exposure obtained, but also an image having a better image quality.

To attain this object, the exposure control device of the present invention, for determining an exposure according to the use of photographing lenses having different focal length, comprises:

means for obtaining a camera-shake limit shutter speed $T_{vf}$ according to a focal length F of the photographing lens, by the following equation:

$$T_{vf} = \log_2 f.$$

According to this construction, for each photographing lens having a different focal length, and in the case of a zoom lens, for each focal length changed according to a rotation of the zoom barrel, an appropriate starting shutter speed $T_{vf}$ by which the effect of camera-shake is obviated is obtained. Therefore, an exposure conforming very closely to each photographing lens is determined.

Further, to obtain a more appropriate starting shutter speed $T_{vf}$, the present invention comprises a means for obtaining a starting shutter speed by the following equation, in which the above equation is corrected (wherein $\alpha$, $\beta$ are constants which are determined so as to satisfy $\log_2 f_0 = (\log_2 f_0) \cdot \alpha + \beta$ for a predetermined focal length $f_0$, and $\alpha < 1$):

$$T_{vf} = (\log_2 f) \cdot \alpha + \beta.$$

According to this construction, for each photographing lens having a different focal length, and in the case of a zoom lens, for each focal length changed according to a rotation of the zoom barrel, an appropriate starting shutter speed $T_{vf}$ at which the effect of camera-shake is obviated, is obtained based on the result of a calculation of $\log_2 f$. Further, in the case of a photographing lens having a focal length which is shorter than $f_0$, $T_{vf}$ is corrected to a value which provides a higher shutter speed than at a value obtained according to $\log_2 f$. In the case of a photographing lens having a focal length which is longer than $f_0$, $T_{vf}$ is corrected to a value which provides a slower shutter speed than at a value obtained according to $\log_2 f$. Accordingly, since $T_{vf}$ is determined in such a manner, an exposure suitable for each photographing lens is obtained.

Further, in a program diagram, if a starting shutter speed $T_{vf}$ at which the effect of camera-shake is obviated is ensured, an exposure is used which allows photographs to be taken having a greater depth of field namely, stopped down photographing can be carried out.

Still further, the present invention provides an exposure control device which can obtain not only a proper exposure, but also a better image quality.

To attain this object, the exposure control device of the present invention comprises;

a means for setting a camera-shake limit shutter speed $(T_{vf})$, a first calculating means for changing at least a shutter speed ($T_{vf}$) according to an object luminance ($E_v$) by a predetermined first program diagram, in accordance with the camera-shake limit shutter speed ($T_{vf}$) set by the setting means, a second calculating means for shifting only an aperture value ($A_v$) to be stopped down by a degree corresponding to a predetermined object luminance ($E_v$), while fixing the camera-shake limit shutter speed ($T_{vf}$) if higher than the camera-shake limit shutter speed ($T_{vf}$) set by the setting means, and a third calculating means for calculating an aperture value ($A_v$) and a shutter speed ($T_v$) according to an object luminance ($E_v$) by a predetermined second program diagram, if different from a combination of the aperture value ($A_v$) shifted by the second calculating means and the camera-shake limit shutter speed ($T_{vf}$).

In the operation of the present invention the first calculating means preferably changes the shutter speed ($T_v$) to the camera-shake limit shutter speed ($T_{vf}$) by the first program diagram with the same aperture value according to the object luminance ($E_v$).

Further, in the operation of the present invention, the third calculating means preferably changes both the aperture value ($A_v$) and the shutter speed ($T_v$) by the second program diagram according to the object luminance ($E_v$).

Still further, in the operation of the present invention, the setting means of the camera-shake limit shutter speed ($T_{vf}$) preferably determines $T_{vf}$ according to the following equation, for each photographing lens having a different focal length, and for a zoom lens, for each focal length changing according to a rotation of the zoom barrel (wherein, in the equation, f is a focal length and $\alpha$, $\beta$ are constants which are set so as to satisfy the equation $\log_2 f_0 = (\log_2 f_0) \cdot \alpha + \beta$ for a predetermined focal length $f_0$, where $\alpha < 1$. That is:

$$T_{vf} = (\log_2 f) \cdot \alpha + \beta.$$

According to this construction, the effect of camera-shake is considerably obviated, and photographing becomes possible under conditions in which an aperture value is stopped down by a predetermined aperture value $A_v$ in comparison with a conventional aperture value $A_v$ which corresponds to a predetermined $E_v$ value.

Further, since only $A_v$ is shifted at $T_{vf}$, the program diagram rises to a right angle at $T_{vf}$. Therefore, when comparing the program diagram of the present invention (FIG. 3A) and a program diagram having an inclination as shown FIG. 4 (approximately 60 degrees in this case), an $A_v$ value corresponding to $E_v$ when a shutter speed $T_v$ is higher than $T_{vf}$, is larger in a program diagram of the present invention than in the prior art. Generally, since the definition of a lens is better when an aperture is stopped down than when an aperture is wider, a higher quality picture is obtained when the amount of stopping down is as large as in a program diagram of the present invention.

Still further, for each photographing lens having a different focal length, and for a zoom lens, for each focal length changed according to a rotation of the zoom barrel, a proper starting shutter speed $T_{vf}$ by, which the effect of camera-shake is obviated, is obtained by the equation:

$$T_{vf} = (\log_2 f) \cdot \alpha + \beta,$$

whereby a program diagram is provided in which only $A_v$ is shifted at $T_{vf}$, by a predetermined $E_v$, and both an $A_v$ value and $T_v$ value change is obtained. Accordingly, since an appropriate value $T_{vf}$ for each photographing lens having a different focal length is determined, a program diagram most suitable for photographing is obtained.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1A:
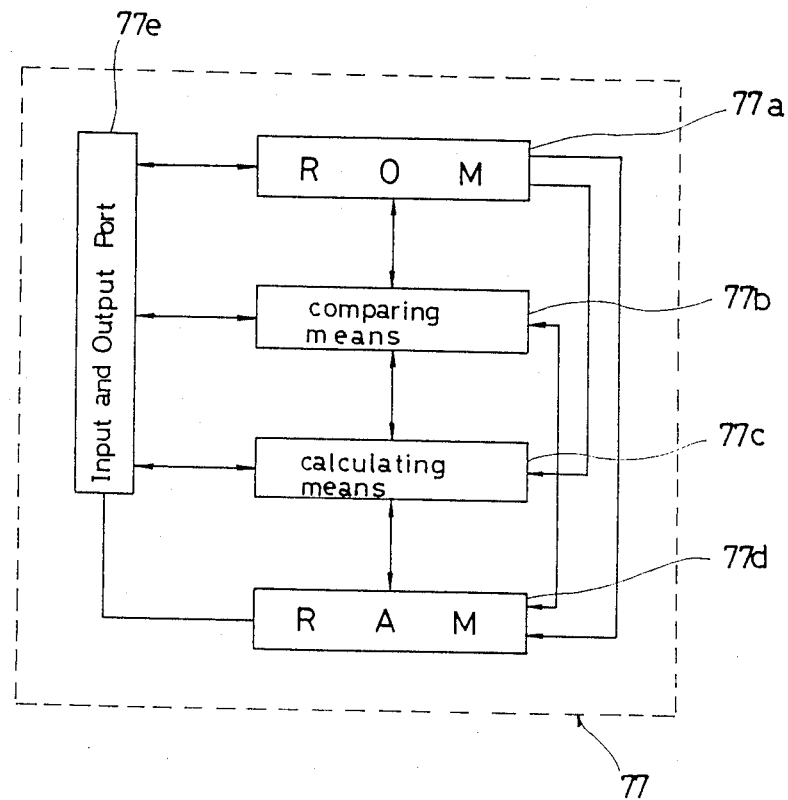
FIG. 1A is a block diagram showing a function of a CPU as a component part of an exposure control device of the present invention.

The embodiments of the present invention are described with reference to an example in which an exposure control device of the present invention is provided in an interchangeable lens camera having an automatic focusing (AF) function and a photographing lens including a lens ROM. Further, the exposure control device of this embodiment is provided with a means for obtaining a camera-shake limit shutter speed $T_{vf}$, for each photographing lens having a different focal length, and for a zoom lens, for each focal length change in accordance with a rotation of the zoom barrel.

EXPLANATION OF THE CONSTRUCTION OF THE CAMERA

The construction of the above interchangeable camera is described below with reference to the drawings. Note that each drawing mentioned in the description is roughly drawn and is used only to enable a clear understanding of the present invention. Therefore, it is obvious that the size, shape, and arrangement of each construction component are not restricted to the shown examples. The same reference numerals are used for the same or corresponding components in each drawing.

Figure 2A:
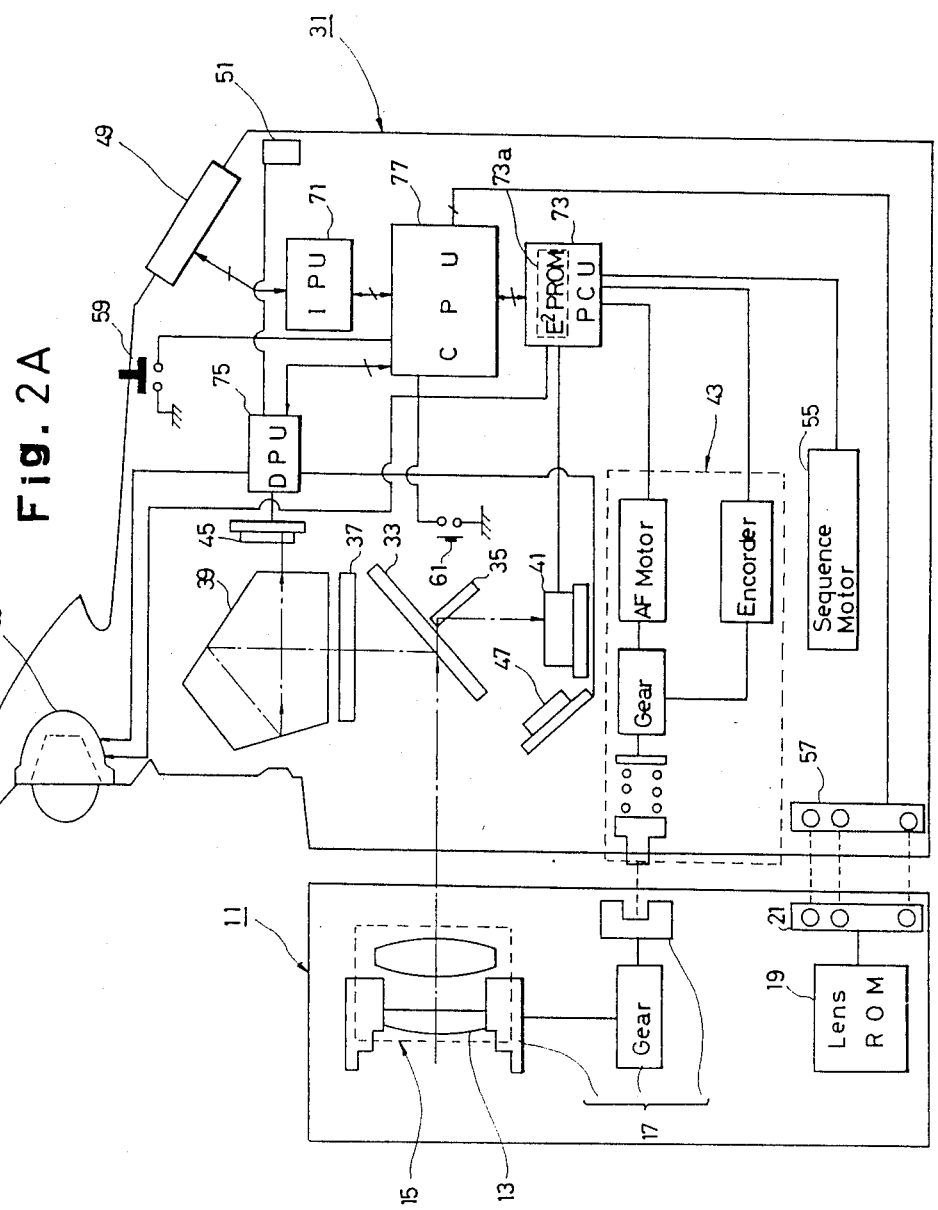
FIGS. 2A through 2D are explanatory drawings of a camera in which the exposure control device of the present invention is applied.
Figure 2:
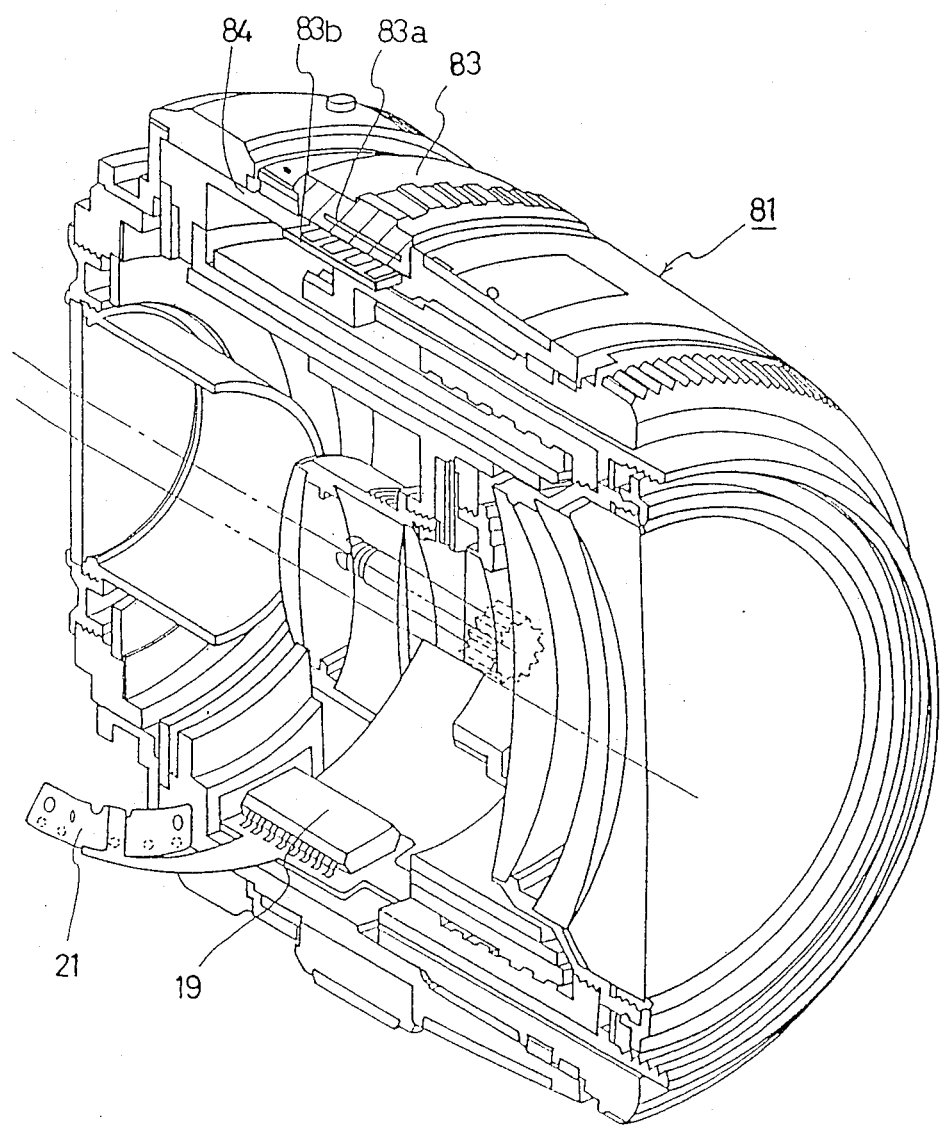
Figure 2:
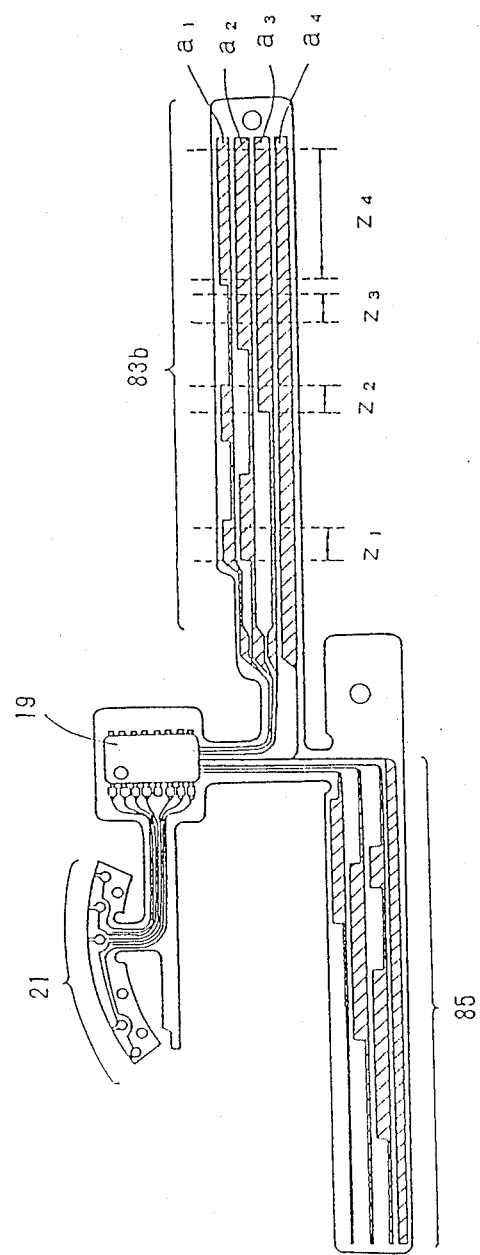

FIG. 2A represents a schematic block diagram of the camera.

In FIG. 2A, 31, and a photographing lens 11 is provided on the camera body 31. In this example, the photographing lens 11 has a single focal length.

The photographing lens 11 is provided with a lens system 15 that includes a focusing lens 13 that is movable along the optical axis as an aid to focusing, and a drive force transmittal mechanism 17 that transmits a drive force to the focusing lens 13 from a drive source provided in the camera body 31. Further, the photographing lens 11 is provided with a lens ROM (Read Only Memory) 19 which stores aperture value information of the photographing lens 11 and focal length information, and lens side electric contact points 21 for electrically connecting the photographing lens 11 and the camera body 31.

The camera body 31 is provided with a finder optical system, such as a main mirror 33, a sub mirror 35, a focusing screen 37 and a pentagonal prism 39, a pickup portion 41 as an aid to automatic focusing, a drive mechanism 43 for driving the focusing lens 13 in the photographing lens 11, a photocell 45 for AE (automatic exposure control), a photocell 47 provided for TTL regulation when using a strobe light, a central concentrating indicator 49 which indicates a condition of the camera, a finder indicator 51 which indicates AF and AE conditions, an internal strobe 53, a sequence motor 55 for film winding and rewinding, camera body side electrical contacts 57 which corresponds to the lens side electric contact points 21, a release switch 59, and an X contact 61 which is used, for example, as a synchronizing contact.

Further, the camera body 31 comprises an IPU (Indication Processing Unit) 71 which is a microcomputer controlling the central concentrating indicator 49, a PCU (Power Control Unit) 73 which is an interface for the pickup portion 41, and controls the sequence motor 55, the AF motor 43, and an aperture and a shutter release magnet, and has an E$^2$PROM 73a, a DPU (Data Processing Unit) 75 which is a microcomputer carrying out photometry and control of the finder indicater 51, and a CPU (Central Processing Unit) 77 which is a microcomputer for a central control. The CPU 77 controls the IPU 71, the PCU 73, the DPU 75, and the lens ROM 19 that is provided in the photographing lens 11.

EXPLANATION OF MEANS FOR OBTAINING $T_{vf}$

The means for obtaining a camera-shake limit shutter speed ($T_{vf}$) for the above camera is now described. In this embodiment, $T_{vf}$ is obtained by the equation $T_{vf} = (\log_2 f) \cdot \alpha + \beta$, and therefore, a method for taking in focal length information used in this equation is described below.

<Taking In Focal Length Information>

In the camera shown in FIG. 2A, information stored in the lens ROM 19 and showing a focal length of the photographing lens is taken in to the CPU 77 through the electric contacts 21 and 57, regardless of the type of lens that is used. Although no problem arises when the photographing lens has only one focal length, if the photographing lens is a zoom lens, the focal length value changes in accordance with the rotation of the zoom barrel. Therefore, in the lens ROM 19 of the zoom lens, information corresponding to focal length changes caused by such a zoom barrel rotation is stored. This information is read as described below.

FIG. 2B is a rough drawing of a zoom lens that is attachable to the camera body 31, cut along the optical axis of the lens. The photographing lens 81 comprises, in addition to the components provided in the photographing lens 11, a zoom barrel 83, a brush 83a fixed to the zoom barrel 83 and moved by the rotation of the zoom barrel 83, and a zoom code plate 83b in slidable contact with the brush 83a. FIG. 2C shows the electric parts provided in the lens 81 comprising the zoom code plate 83b, the lens ROM 19, the electric contacts 21 provided in the lens 81, and a distance code plate 85. These parts are mounted in a cylindrical part of the photographing lens in such a manner that each code plate 85 is wound along the periphery of the cylindrical part 84.

Figure 2D:
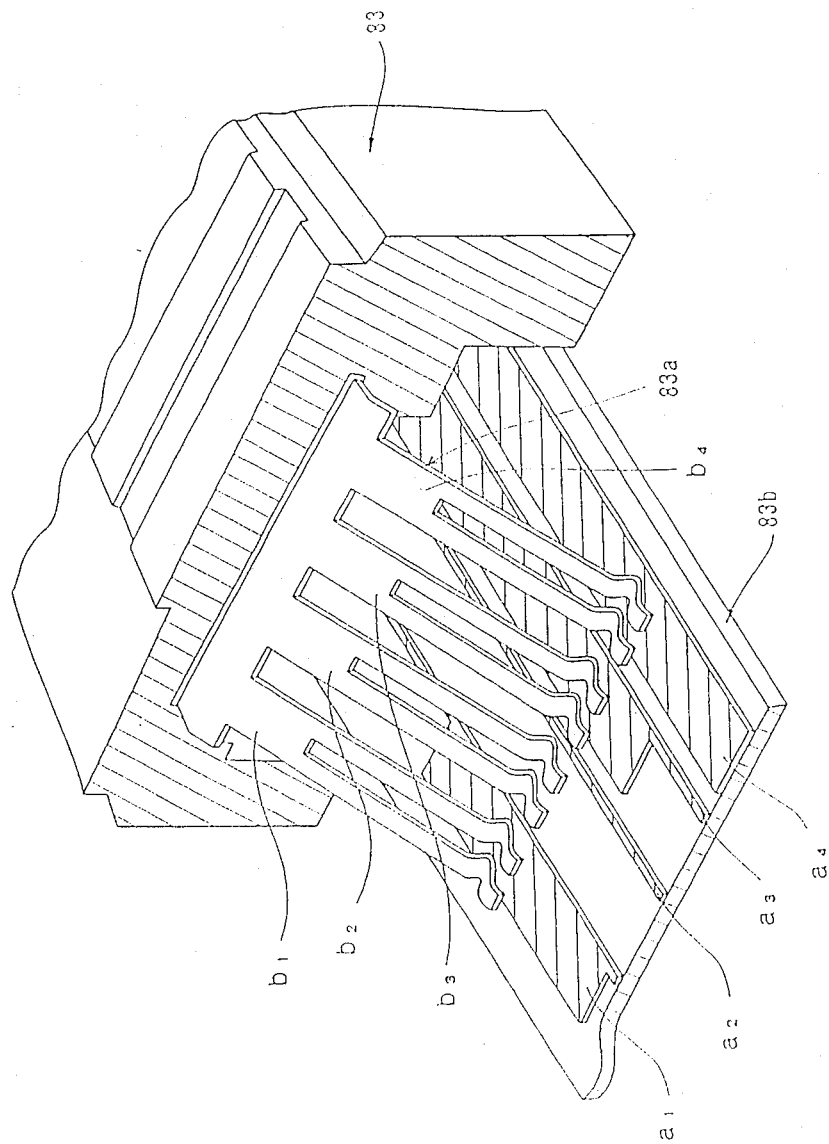

FIG. 2D is a perspective view on an enlarged scale, showing a part of a zoom encoder comprising the zoom barrel 83, the brush 83a, and the zoom code plate 83b.

When the zoom barrel 83 is rotated, the focal length of the photographing lens 81 is changed, and at the same time, the brush 83a is moved backward and forward while in contact with the zoom code plate 83b, along the longitudinal direction of the zoom code plate 83b shown in FIG. 2C, and stopped at the position at which the rotation of the zoom barrel is stopped. In this embodiment, four distribution patterns extending from the lens ROM 19 and shown by $a_1$, $a_2$, $a_3$, and $a_4$ are provided on a face of the zoom code plate 83b in contact with the brush 83a. Note that the number of distribution patterns decides the degree of resolving power shown by a focal length changed by the rotation of the zoom barrel 83, and this number of distribution patterns may be changed according to a desired design and is not restricted to this embodiment. One of the four distribution patterns, in this case the distribution pattern $a_4$, is an earth line. The other patterns $a_1$ through $a_3$ are formed in such a manner that the patterns are made wide or narrow in accordance with a position thereof along the longitudinal direction of the zoom code plate. As shown in FIG. 2D, the brush 83a has four contacts $b_1$ through $b_4$ corresponding to the distribution patterns $a_1$ through $a_4$, which are electrically connected to each other. Although many different shapes of contacts are possible, each contact in this embodiment has a dual construction which improves the reliability of the contact. Also, each contact is constructed to come into contact with the corresponding distribution pattern at the wide portion of the distribution pattern, and in particular, the contact shown by $b_4$ is always in contact with the distribution pattern $a_4$ (the earth line).

In the construction decribed above, when the brush 83a is moved in accordance with a rotation of the zoom barrel 83, at a position $z_1$ of the zoom code plate 83b (shown in FIG. 2C), each contact of the brush 83a and the distribution patterns $a_1$, $a_2$, and $a_3$ are in contact at $a_1$ and $a_2$, and are not in contact at $a_3$. Since the distribution patterns $a_1$ through $a_3$ are pulled up on the lens ROM 19, and each contact of the brush is connected to the earth line through the distribution pattern $a_4$, a voltage condition of each distribution pattern $a_1$, $a_2$, $a_3$ at the $z_1$ position is (0,0,1) in the order of $a_1 \sim a_3$ (0 denotes a low level). The voltage condition is (0,1,0) at a position $z_2$, (1,0,0) at position $z_3$, and is (0,0,0) at position $z_4$. An electric signal obtained by changing the voltage condition is used directly as an address of the lens ROM 19, so that information corresponding to focal length information stored in the lens ROM 19 is read. The information read from the ROM and showing the focal length is transmitted to the CPU 77 in the same way as for a photographing lens having a single focal length.

<Explanation of an Approximate Calculation of $\log_2 f$>

A process for obtaining a camera-shake limit shutter speed $T_{vf}$, by using information showing a focal length obtained as described above, is explained below. In this embodiment, $T_{vf}$ is first obtained as a result of an approximate calculation of $\log_2 f$. The means for obtaining $T_{vf}$ is mainly constructed by the lens ROM 19 and the CPU 77, which has a construction as described later.

Figure 1B:
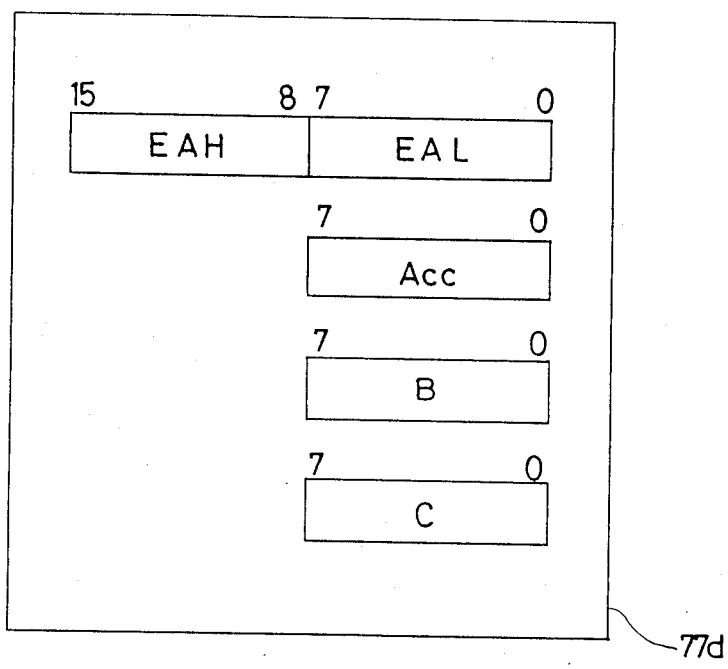
FIG. 1B is an explanatory drawing of a construction of RAM memory used in the CPU of FIG. 1A.
Figure 1C:
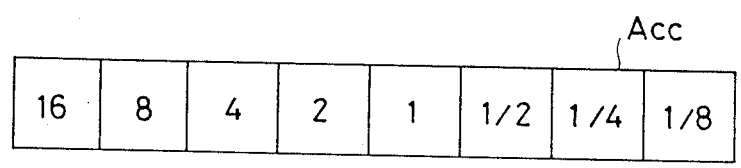
FIG. 1C is a drawing showing an example of the use of an accumulator $A_{cc}$ when obtaining $T_{vf}$.

FIG. 1A is a block diagram showing a function of the CPU 77 comprising a ROM 77a which stores a program for operating the means for obtaining $T_{vf}$, 77b shows a comparing means 77b, a calculating means, a RAM 77d, and an input and output port 77e. The CPU 77 carries out information transfers to and from the lens ROM 19, the PCU 73, and the DPU 73 through the input and output port 77e. In this embodiment, the RAM 77d comprises an EA register operating as a 16 bit register, B and C registers which are 8 bit registers, and an accumulator $A_{cc}$, as shown in FIG. 1B. Note that the EA register is divided when used, i.e., is used as an EAH register which is a high-order 8 bit register, and as an EAL register which is a low-order 8 bit register. The process for the approximate calculation depends upon a degree of accuracy (resolving power) of $T_{vf}$. In this embodiment, since the luminance of an object to be photographed is currently obtained at every $\frac{1}{8} E_v$, the process for obtaining $T_{vf}$ is described below as an example corresponding thereto. Further, each bit of the accumulator $A_{cc}$ in an approximate calculation of $\log_2 f$ is weighed as shown in FIG. 1C.

Figure 1D:
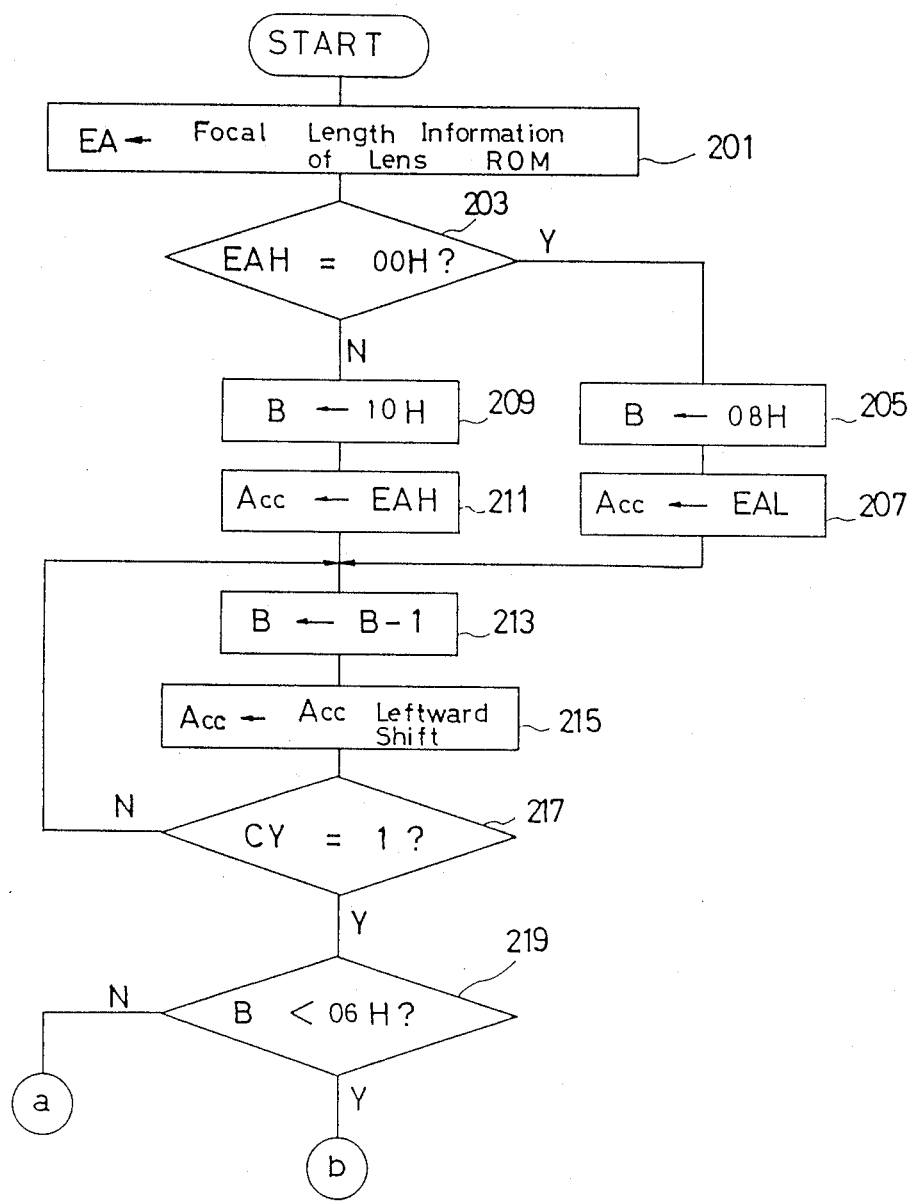
FIGS. 1D through 1F are flow charts of the CPU operation for determining the means for obtaining $T_{vf}$.
Figure 1:
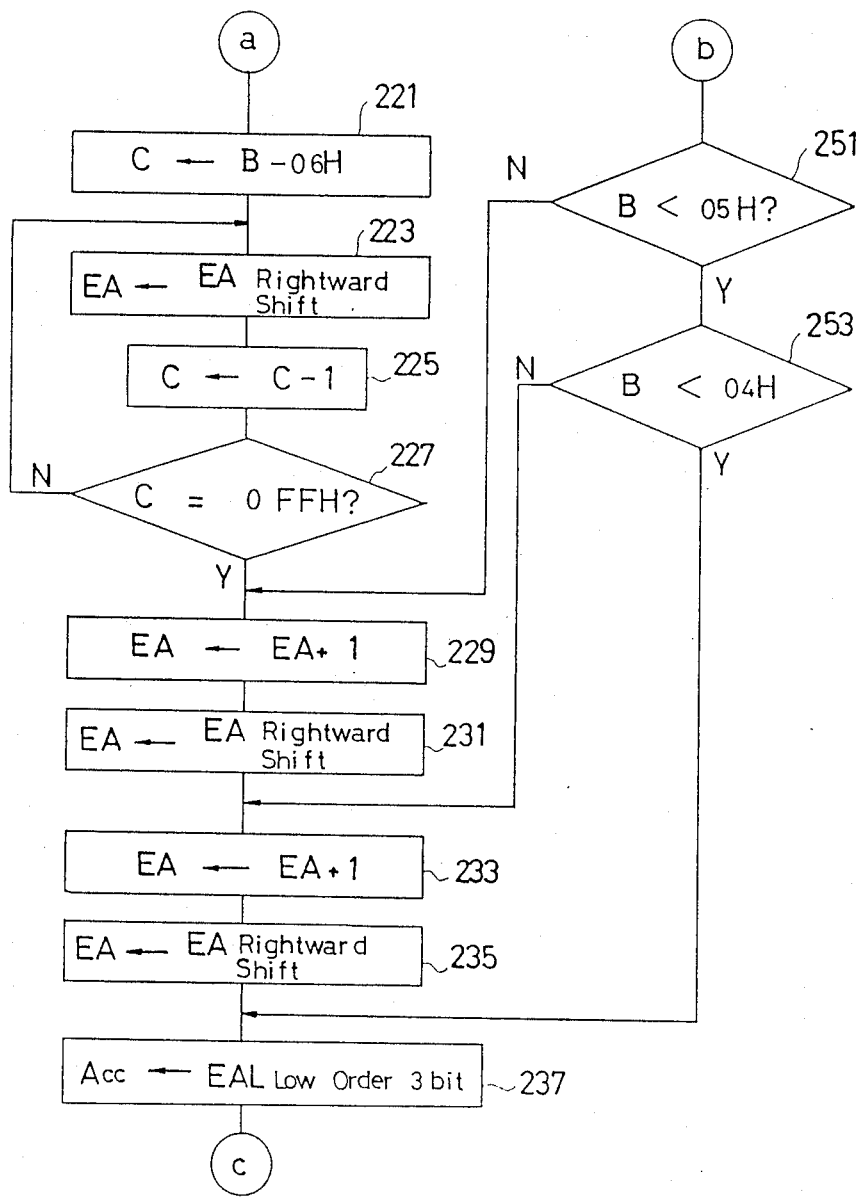
Figure 1F:
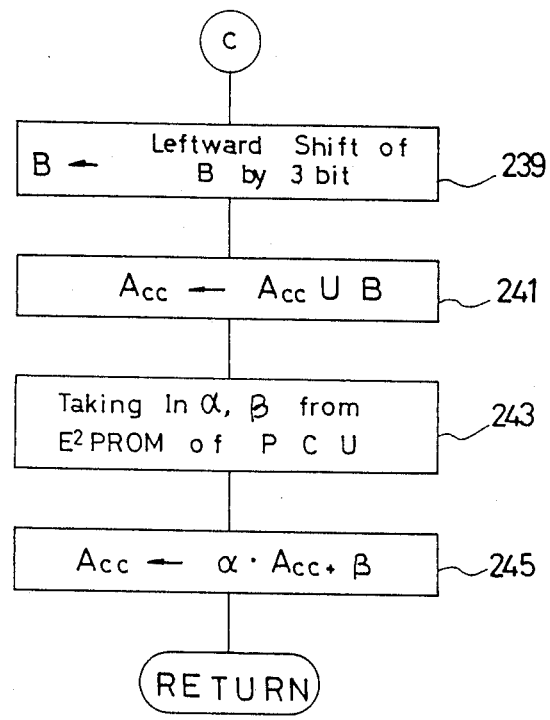

A process for the approximate calculation of $\log_2 f$ is described below with reference to a flow chart of the CPU 77 for operating the means for obtaining $T_{vf}$, as shown in FIGS. 1D through 1F.

The CPU 77 takes information stored in the lens ROM 19 and showing a focal length of the photographing lens into the EA resister (step 201). Regarding the information showing a focal length, as described above, where the photographing lens has a single focal length, information of the focal length is taken in, and for a zoom lens, information corresponding to a focal length decided by a rotation of the zoom barrel is taken in. Note that, in this embodiment, since the information showing a focal length stored in the lens ROM 19 is compressed to 8 bits to be stored, the information is changed to a type of integer to be stored when stored in the EA register of the CPU 77.

This compression and changing are briefly described below. In 8 bit information stored in the lens ROM 19, the low order 2 bits are a first bit group having a weighting of $2^2$ and $2^4$ from the low order side, and the high order 6 bits are a second bit group having a weighting $2^0$, $2^1$, $2^2$, $2^3$, $2^4$, and $2^5$ from the high order side. A change to an integer is made by multiplying the sum of values of each bit of the second bit group by the product of values of each bit of the first bit group, and then multiplying the result by a predetermined constant.

Subsequently, with regard to the information stored in the EA register from the lens ROM 19 and showing a focal length, it is determined whether or not data of a high-order 8 bit of the EA register, i.e., data of the EAH register, is 00H (H means a hexadecimal indication, and is the same hereinafter). The result of this comparison, shows whether the focal length of the present photographing lens is more than, equal to or less than 256 mm ($2^8$).

If EAH=00H in step 203, the B register is set to 08H, and data of the EAL resister is stored in the accumulator $A_{cc}$ (steps 205, 207). On the other hand, if EAH≠00H, the B register is set to 10H, and data of the EAH register is stored in the accumulator $A_{cc}$ (steps 209, 211).

Then, the data of the B register is decremented by 1, and the resultant value is stored in the B register (step 213). The content of the accumulator $A_{cc}$ is shifted leftward, i.e., the content is shifted by 1 bit from a low-order to a high-order (step 215), and then it is determined whether or not a carry (CY) in this shift is 1 (step 217). If the carry (CY) is 0, the process is returned to step 213, and steps 213 and 215 are repeated until CY becomes 1.

If CY=1, i.e., if the bit of the highest order of focal length information stored in the EA register appears, it is determined to what column this bit corresponds. The number of the column is shown in the present value of the B register. Therefore, in the above process, the value of the integer part of the approximate calculation of $\log_2 f$ is obtained.

To obtain a decimal part ($\frac{1}{8}$ step) of the approximate calculation of $\log_2 f$, it is determined whether or not B<06H (step 219). In this comparison, when the value is more than or equal to 6, the value obtained by subtracting 6 from the value of the B register is stored in the C register B (step 221), and the value of the EA register is then shifted rightward, i.e., is shifted by 1 bit from a high-order bit of the EA register to a low-order bit of the register (step 223), so that a value obtained by subtracting 1 from the C register is stored in the C register (step 225). If C=OFFH is not true, the process is returned to step 223, and steps 223 and 225 are repeated until C=OFFH, i.e., C=−1. Accordingly, when C=OFFH, i.e., when information of the fifth low-order bit counted from the highest order column of the information showing a focal length stored in the EA register is stored in the 0 bit of the EA register, 1 is added to the value of the EA register, and the resultant value is stored to the EA register (steps 227 and 229).

At this time, the value of the EA register is shifted rightward by 1 bit, and by this shift, in the 0 bit of the EA register, information of the fourth bit, which is counted in a low-order direction from the highest order column of the information stored in the EA register and showing a focal length is stored (step 231) and 1 is added to the EA register, whereby the resultant value is again stored in the EA register (step 233). In steps 229 and 233, 1 is added to the values in the EA register means to correct the columns of 1/16 $E_v$ and 1/32 $E_v$, and thus the approximate calculation of $\log_2 f$ is carried out in a high accuracy. Note that, although 1 is added to values of fourth and fifth bits counted in a low-order direction from the highest column of the information showing the focal length, this is because $T_{vf}$ corresponds to the $\frac{1}{8} E_v$ step, and if a resolving power of the $T_{vf}$ is changed, the bit position to which 1 is added is changed.

The value of the EA register is further shifted rightward by 1 bit (step 235), and as a result, in 0 through 2 bits of the EA register (to be exact, the EAL register), information corresponding to the decimal part ($\frac{1}{8}$) of a result of the approximate calculation of $\log_2 f$ is stored. Information of the lower order 3 bits, i.e., the 0 through 2 bits of the EAL register, is stored in the accumulator $A_{cc}$ (step 237).

Then, a process for obtaining a final result of the approximate calculation of $\log_2 f$ is carried out. As described above, an integer part of the result of the approximate calculation of $\log_2 f$ is information stored in the B register. Therefore, taking a logical sum of the information stored in the B register and the information stored in the accumulator $A_{cc}$ and showing the decimal part, the result of the approximate calculation of $\log_2 f$ is obtained. To adjust the position of the figure of the information of the B register to the position of the figure of the information of $A_{cc}$, the information of the B register is shifted leftward by 3 bits (step 239), and the logical sum is taken (step 241). Accordingly, the result of the approximate calculation of $\log_2 f$ is obtained.

At step 219, which is in the middle of the approximate calculation, if B<06H, it is determined whether or not B<05H (step 251). In this comparison, if B is larger than or equal to 5, this means that B is equal to 5, and as a result, the process at step 229 is carried out. On the other hand, if B<05H, it is determined whether or not B<04H (step 253). In this comparison, if B is larger than or equal to 4, this means that B is equal to 4, and as a result, the process at step 233 is carried out. Accordingly, when B is 5, similar to the case in which B is 6, a process for improving an accuracy of the approximate calculation is carried out (steps 229 and 233). On the other hand, when B is 4, a process in which 1 is added to the fourth bit from the highest bit to improve an accuracy of the approximate calculation is carried out (step 233).

In step 253, when B<04H, the process at step 237 is carried out.

The result of the approximate calculation of $\log_2 f$, obtained as described above, is a value generally known as a camera-shake limit shutter speed, and therefore, is preferably used as a starting point of a shutter speed $T_{vf}$ when determining a program diagram for each photographing lens having a different focal length. Therefore, although the result of the approximate calculation can be used directly as $T_{vf}$, in this embodiment, the following correction is further made to the result of the approximate calculation.

<Correction of the Result of the Approximate Calculation of $\log_2 f$>

The reason why it is preferable to correct the result of the approximate calculation of $\log_2 f$ is as follows:

When taking good pictures under normal conditions, if the focal length of the photographing lens is short, since the depth of field is long, the aperture is preferably relatively wide and the shutter speed is high. On the other hand, if the focal length is long, since the depth of field is short, the aperture is preferably relatively closed and the shutter speed is low. Further, the effect of camera-shake on a photographing lens having a short focal length is greater than the effect thereof on a photographing lens having a long focal length, since the total length of the photographing lens having the short focal length is short, and the total length of the photographing lens having a long focal length is long.

In this regard, it would appear that the effect of camera-shake on a photographing lens having a 300 mm focal length, for example, is 10 times greater than that on a lens having a 30 mm focal length, but this is not true, since the effect of camera-shake on the former lens is less than 10 times that on the latter lens, because the former lens is easier to be hold. Therefore, when using a photographing lens having a focal length f of 24 mm, for example, rather than using a shutter speed of about 1/24 sec, it is preferable to use a higher shutter speed (1/30 sec or 1/60 sec). Similarly, when using a photographing lens having a focal length f of 300 mm, for example, rather than use a shutter speed of about 1/300 sec, it is possible to use a lower shutter speed without worrying about the effect of camera-shake.

Accordingly, in this embodiment, a result of the approximate calculation of $\log_2 f$ is corrected according to the equation (1) below, so that the result of the correction is a starting shutter speed $T_{vf}$ of the program diagram for each photographing lens having a different focal length.

$$T_{vf} = (\log_2 f)\cdot\alpha + \beta \qquad (1)$$

wherein $\alpha<1$, and $\alpha$ and $\beta$ are constants which satisfy $\log_2 f_0 = (\log_2 f_0)\cdot\alpha + \beta$ for a predetermined focal length $f_0$.

Note that, in the case, this correction means of the approximate calculation of $\log_2 f$ is mainly constructed by the CPU 77 and the PCU 73. The reason for the use of the PCU 73 is that this embodiment is constructed in such a manner that the constants $\alpha$ and $\beta$ in the equation (1) are stored in the E$^2$PROM 3a provided in the PCU 73, so that the CPU 77 takes in these constants when necessary. Although a construction in which $\alpha$ and $\beta$ are stored in the program ROM 77a of the CPU 77, for example, without the E$^2$PROM 73a, is possible, if the E$^2$PROM is provided, an advantage by which $\alpha$ and $\beta$ are easily changed, even if the design is changed, is obtained.

A correction for a result of the approximate calculation of $\log_2 f$ is described below with reference to an example wherein $f_0 = 250$ mm.

First, when $f_0 = 250$ mm, $\alpha$ and $\beta$ satisfying an equation of $\log_2 250 = (\log_2 250)\cdot\alpha + \beta$ are determined. Although $\alpha$ and $\beta$ can be various values, in this embodiment, it is assumed that $\alpha = \frac{3}{4}$ and $\beta = 2$. These values are stored in a predetermined adress of the E$^2$PROM 73a.

The subsequent correction process is carried out after step 241 shown in FIG. 1F as described below.

The CPU 77 takes $\alpha$ and $\beta$ stored in the E$^2$PROM 73a of the PCU 73 into the calculating means (step 243), and then uses a result of the approximate calculation of $\log_2 f$ stored in the $A_{cc}$ to carry out the correction calculation of the above equation (1), to obtain a starting shutter speed $T_{vf}$ (step 245).

An effect of the correction process for the result of the approximate calculation of $\log_2 f$ carried out as described above is described below with reference to an example.

(1) When a photographing lens has a focal length f=250 mm, a result of the approximate calculation of $\log_2 250$ is $\log_2 250 \approx 8$, since $250 \approx 2^8 = 256$, and a result of the correction according to equation (1) is $$T_{vf} = 8 \times \tfrac{3}{4} + 2 = 8.$$

This corrected value is equal to the result of the approximate calculation.

(2) When a photographing lens has a focal length f=1000 mm, although $\log_2 \approx 1000 \; 10$, since $1000 \approx 2^{10} = 1024$, the result of the approximate calculation is corrected according to equation (1), so that the starting shutter speed is changed to a lower value.

$$T_{vf} = 10 \times \tfrac{3}{4} + 2 = 9.5$$

(3) When a photographing lens has a focal length f=30 mm, although $\log_2 30 \approx 5$, since $30 \approx 2^5 =$, the result of the approximate calculation is corrected according to equation (1), so that the starting shutter speed is changed to a higher value.

$$T_{vf} = 5 \times \tfrac{3}{4} + 2 = 5.75.$$

Therefore, it can be understood that, by carrying out a correction as described above, the starting shutter speed is compressed from both sides of the the long and short focal lengths, with f=250 mm as the center. Note that, although $T_{vf}$ for each focal length f is compressed from f=250 mm, the $f_0$ is not restricted to 250 mm, but may be 125 mm or 500 mm.

EXPLANATION OF CALCULATION MEANS FOR EXPOSURE CONDITION

The calculation means used for obtaining an appropriate exposure condition (an aperture value $A_v$ and a shutter speed $T_v$) for each object luminance ($E_v$) is described below.

Figure 3A:
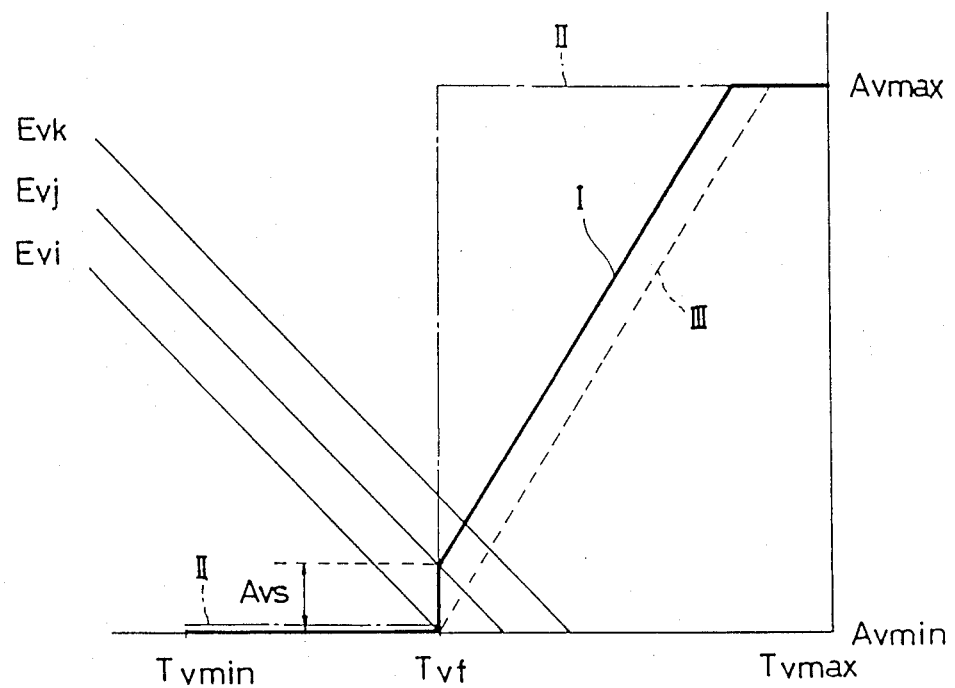
FIG. 3A is an explanatory drawing of a program diagram obtained by an exposure control device of the present invention.

The starting shutter speed $T_{vf}$ obtained as described above is a shutter speed by which it is ensured that the effect of camera-shake is obtained. Therefore, an exposure condition for obtaining a good picture is preferably shifted relative to $T_{vf}$, in such a manner that an aperture value $A_v$ is stopped down by a predetermined value (this shift amount is shown by $A_{vs}$ (FIG. 3A). Accordingly, in this embodiment, the program diagram is determined in such a manner that, when $E_v$ is larger than or equal to $A_{vmin} + T_{vf}$ ($A_{vmin}$ means an open F value of the photographing lens), only $A_v$ is shifted by a predetermined $E_v$ value, and then both $A_v$ and $T_v$ are changed. FIG. 3A is an explanatory drawing of a program diagram in which the $A_v$ value is shifted by ($E_{vj} - E_{vi}$). In this drawing, a solid line shown by I is the program diagram, and a broken line III shows a program diagram of a prior art. The program diagram shown by I is obtained, after obtaining $T_{va}$ and $T_{vb}$ at the same $E_v$ value according to the following equations (a) and (b), by choosing the higher value thereamong as the $T_v$ value:

$$T_{va} = E_v \cdot Y/X + \delta \tag{a}$$

$$T_{vb} = T_{vf} \cdot A_v = E_v - T_{vb} \tag{b}.$$

Figure 4:
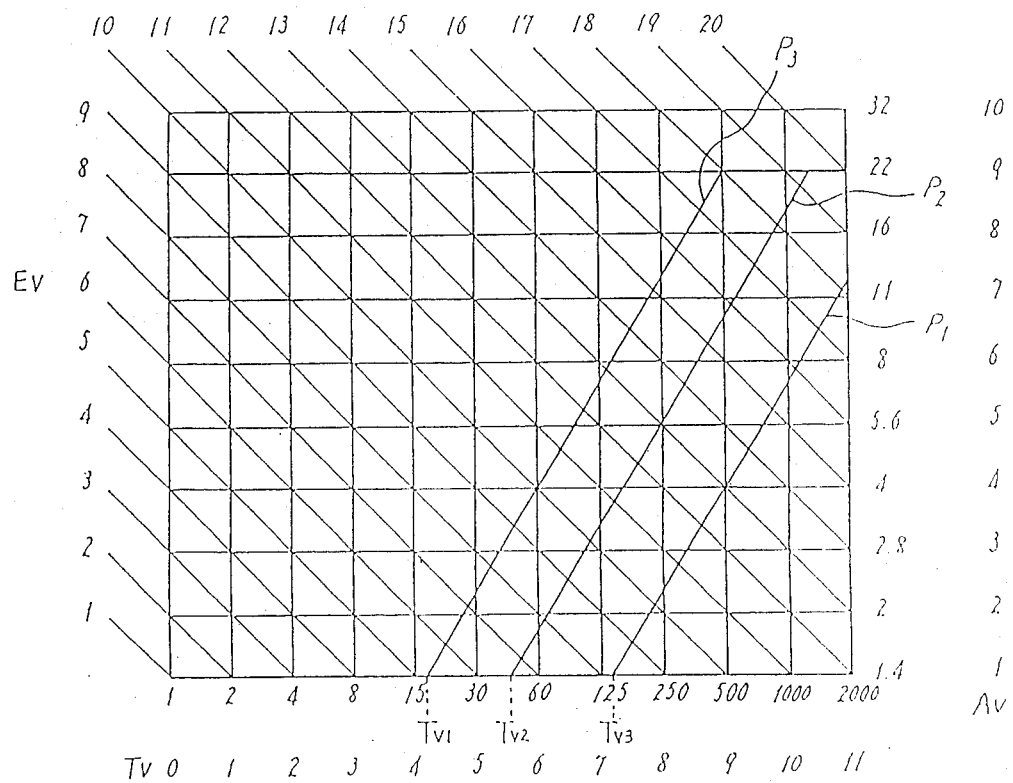

Note that X and Y are constants defining inclinations of program diagrams, where X=8 and Y=3 in the case of FIG. 4. Also, $\delta$ is the $T_v$ value when $E_v = 0$, and is obtained by the following equation (c).

$$\delta = (1 - Y/X) \cdot T_{vf} - Y(A_{vmin} + A_{vs})/X \tag{c}.$$

<Construction of Calculating Means>

In this embodiment, the calculating means for determining an exposure condition according to a program diagram shown by I is constructed mainly by the CPU 77 and the PCU 73. The reason for the use of the PCU 73 is that this embodiment is constructed in such a manner that the constants X and Y determining an inclination of a program diagram and the constant $A_{vs}$ denoting a shift amount are stored in the E²PROM 73a provided in the PCU 75, and thus the CPU 77 takes in these constants when necessary. Another embodiment may be constructed in such a manner that X, Y, and $A_{vs}$ are previously stored in the program ROM 77a, for example, so that the PCU 73 is not used. But if the E²PROM is used as described above, an advantage is obtained in that the constants can be easily changed when a design change is made.

In a calculation in which an exposure condition is determined, the EAH register of the RAM 77d of the CPU 77 is used as a register for $T_v$, the EAL register is used as a register for $A_v$, and $A_{cc}$ is used as a register for $T_{vf}$. The calculating process and the comparing process used in the operation are carried out by the calculating means 77c and the comparing means 77d, respectively.

<Procedure for Determining an Exposure Condition>

Figure 3B:
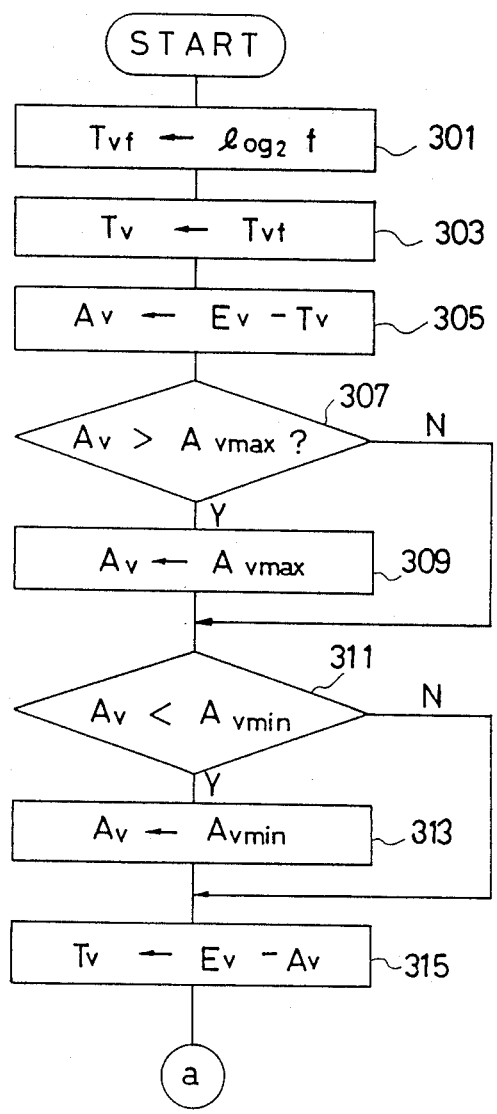
FIGS. 3B through 3D are flow charts of the operation of a CPU for operating a calculating means for obtaining an exposure condition; and, FIG. 4 is an explanatory drawing showing a block diagram of a prior art program diagram.
Figure 3C:
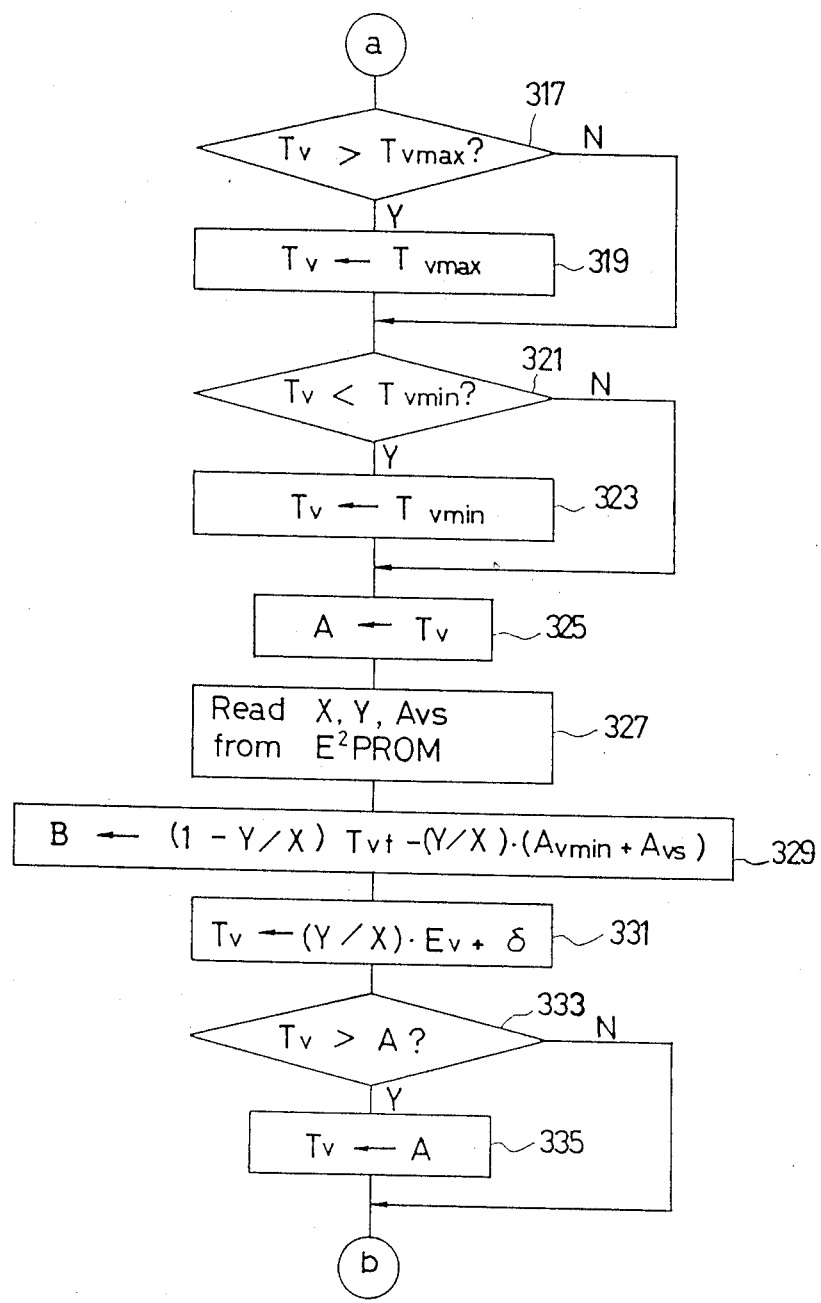
Figure 3D:
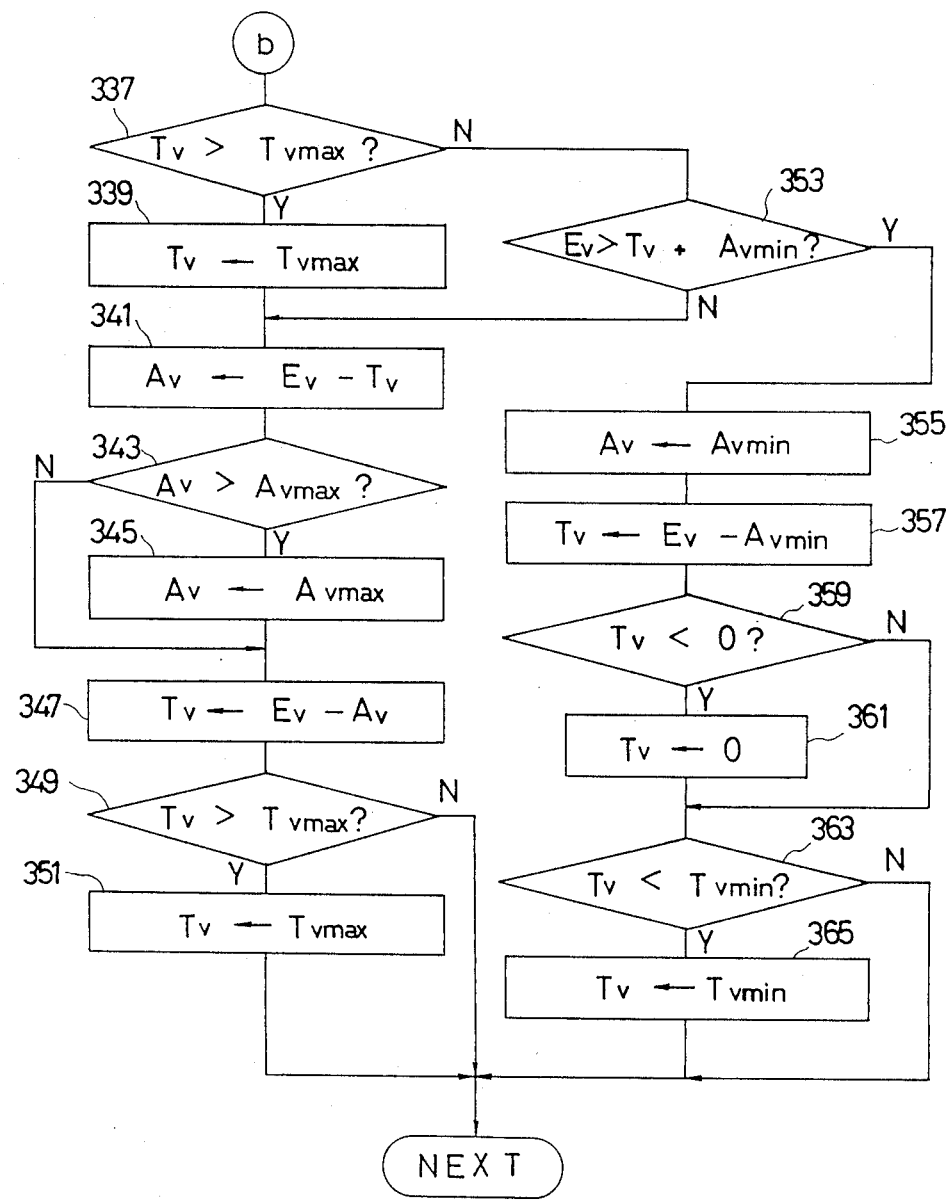

FIGS. 3B through 3D are flow charts of the CPU for operating the calculating means for determining an exposure condition.

The result of the approximate calculation of $\log_2 f$ is stored in the $T_{vf}$ register (step 301), and then the data of the $T_{vf}$ respectfully is stored in the $T_v$ respectfully (step 303). Then an object luminance $E_v$, is obtained from luminance information in the DPU 75 (shown in FIG. 2A), so that a calculation of $E_v - T_v$ is carried out by using $E_v$, and the result of the calculation is stored in the $A_v$ register (step 305). Subsequently, it is confirmed whether the data in the $A_v$ register is a value in a range between the open aperture ($A_{vmin}$) and the minimum aperture ($A_{vmax}$) of the photographing lens used. If the data value is within that range, the data of the $A_v$ register is maintained as it is, and if the data value is outside that range, the data is replaced by an appropriate one of $A_{vmin}$ and $A_{vmax}$, according to the conditions (steps 307 through 331). Note that information showing $A_{vmin}$ and $A_{vmax}$ is stored in the lens ROM of the photographing lens, and thus this information is taken in to the CPU from the lens ROM.

The $T_v$ value is obtained, on the basis of the $A_v$ value determined as described above, and stored in the $T_v$ register (step 315), and it is confirmed whether the data in the $T_v$ register is a shutter speed which is within a capacity of the shutter mechanism of the camera. If the shutter speed is within that capacity, the data in the $T_v$ register is maintained as it is, and if the shutter speed is outside that capacity, the data is replaced by an appropriate one of the maximum shutter speed (the shortest exposure time) $T_{vmax}$ and the minimum shutter speed $T_{vmin}$ (steps 317 through 323). By carrying out the process of steps 307 through 323, the diagram shown by II in FIG. 3A can be obtained. The $T_v$ value (corresponding to $T_{vb}$ of equation (b)) determined as described above, is stored in the A register (step 325).

Next, the CPU 77 reads the constants X and Y defining inclinations of the program diagrams and the constant $A_{vs}$ showing a shift amount from the E²PROM 73a of the PCU 73 (step 327). These X, Y and $A_{vs}$ are values corresponding to the design of the camera, respectively. In the present embodiment, X=8, Y=3, and $A_{vs}$ is a value corresponding to 1 $E_v$.

Then, $\delta$ is obtained by equation (c), and is stored in the B register (step 329).

The $T_{va}$ value is obtained by the equation (a), and is stored in the $T_v$ register (step 331).

Then, the data ($T_{va}$) of the $T_v$ register is compared with the data ($T_{vb}$) of the A register. When $T_v > A$, the data of the $T_v$ register is maintained as it is. If $T_v < A$, the data of the A register is stored in the $T_v$ resister (step 333 and 335). In the process so far, the larger of the values $T_{va}$ and $T_{vb}$ obtained by the equations (a) and (b) is stored in the $T_v$ register.

The process shown by steps 337 through 365, carried out after step 335, is used to determine an appropriate $T_v$ value and $A_v$ value while considering the maximum shutter speed $T_{vmax}$ and the minimum shutter speed $T_{vmin}$ of the camera, and the $A_{vmin}$ and $A_{vmax}$ of the photographing lens in use.

First, if the $T_v$ value stored in the $T_v$ register at present is larger than the maximum shutter speed $T_{vmax}$ of the camera, the value of the $T_v$ register is replaced by $T_{vmax}$ (step 339), and thus the $A_v$ value is obtained by using this $T_{vmax}$ (step 341). Then, if the $A_v$ value obtained as described above is larger than $A_{vmax}$, the value of the $A_v$ register is replaced by $A_{vmax}$, and if the $A_v$ is smaller than $A_{vmax}$, the data is maintained as it is (steps 343 and 345). The $A_v$ value at this time is determined as the aperture to be used. Then the $T_v$ value is newly obtained by using the $A_v$ value in the $A_v$ register, and this $T_v$ value is stored in the $T_v$ resister (step 347). $T_v$ is again compared with $T_{vmax}$ (step 349), and if $T_v$ is larger than $T_{vmax}$, the value of the $T_v$ register is replaced by $T_{vmax}$, and thus, this value is determined as the shutter speed. Conversely, if $T_v$ is not larger than $T_{vmax}$, the value in the $T_v$ register is determined as the shutter speed. In step 337, if the $T_v$ value is less than or equal to $T_{vmax}$, and the sum of the $T_v$ value and the open aperture value $A_{vmin}$ is more than or equal to the present $E_v$ value of the object, the process of steps 341 through 351 is carried out.

On the other hand, when the present $T_v$ value is judged to be less than $T_{vmax}$ at step 337, and the sum of the $T_v$ value and the open aperture value $A_{vmin}$ is judged to be less than the $E_v$ value, the value of the $A_v$ register is replaced by $A_{vmin}$ (step 355), and then the $T_v$ value is newly obtained under this condition, and this $T_v$ value is stored in the $T_v$ register (step 357). If this $T_v$ value is less than 0, the value of the $T_v$ register is replaced by 0 (step 361), and if more than 0, the value is maintained as it is, and thus the value of the $T_v$ register is compared with the minimum shutter speed (the longest exposure time is obtained) $T_{vmin}$ (step 363). When $T_v < T_{vmin}$, the $T_{vmin}$ value is determined as the shutter speed, and if $T_v < T_{vmin}$, the $T_v$ value stored in the $T_v$ register at present is determined as the shutter speed. Note that the aperture is open ($A_{vmin}$) in each case.

OTHER EMBODIMENTS

The present invention is not restricted to the above embodiment, and can be modified as described below.

In the embodiment described above, for each photographing lens having a different focal length, and for each focal length change in accordance with a rotation of the zoom ring of a zoom lens, the limit shutter speed $T_{vf}$ at which the effect of camera-shake is obviated is obtained by a calculation, and program diagrams of the present invention are obtained. The present invention, however, can be applied to many different exposure control devices, regardless of the method of setting a camera-shake limit shutter speed.

As shown in FIG. 4, for example, even if any program diagram is chosen according to the focal length of the lens used, i.e., even if $T_{vf}$ is preset, the present invention can be applied. In this case, if the construction of the device is as described below, then, for example, the determination of program diagrams (exposure condition) can be carried out in the same way as in the above embodiment.

First, each starting shutter speed $T_{v1}$, $T_{v2}$, and $T_{v3}$ of program diagrams $P_1 \sim P_3$ in FIG. 4, and threshold focal lengths $f_1$ and $f_2$ for controlling each photographing lens having a different focal length with three program diagrams $P_1$ through $P_3$, are stored in the E²PROM 73a of the PCU 73, respectively. If a focal length $f_n$ of the photographing lens used is taken in to the CPU 77, as in the above embodiment, this $f_n$ and the above $f_1$ and $f_2$ are compared with each other. This comparison can be easily carried out by using the comparing means 77b. Then, using an electrical signal obtained by this comparison, a corresponding starting shutter speed is read from $T_{v1}$, $T_{v2}$, and $T_{v3}$ in the E²PROM 73a. The read shutter speed is determined as $T_{vf}$, and then a process after step 303 shown in FIG. 3B is carried out. According to this operation, even if a camera-shake limit shutter speed $T_{vf}$ is a common value for several different photographing lenses, a program diagram starting from a shutter speed at which the effect of camera-shake is obviated, and which enables photographing with a large depth of field, is obtained.

The procedure in which $T_{vf}$ is obtained by the approximate calculation of $\log_2 f$ when setting $T_{vf}$ is not restricted to the flow chart shown in FIGS. 1D through 1F, and may be obtained by other procedures. Further, the procedure for determining an exposure condition is not restricted to the flow chart shown in FIGS. 3B through 3d, and may be obtained by other procedures.

The exposure control device of the present invention can be applied not only to a camera having the construction described in the above embodiment, but also to other cameras, such as an electronic still camera and an interchangeable lens camera having only an AE function.

As understood from the above description, according to the exposure control device of the present invention, for each photographing lens having a different focal length, and, for a zoom lens in which the focal length changed in accordance with a rotation of a zoom ring, an appropriate starting shutter speed $T_{vf}$ at the effect of camera-shake is obviated is obtained every time a program diagram appropriate to each photographing lens is determined.

Accordingly, not only an appropriate exposure but also a better quality image is obtained.

Further, according to the exposure control device of the present invention, for each photographing lens having a different focal length, and for a zoom lens in which the focal length is changed in accordance with a rotation of a zoom ring, an appropriate starting shutter speed $T_{vf}$ at which the effect of camera-shake is obviated is obtained on the basis of a result of a calculation of $\log_2 f$. Further, the $T_{vf}$ for a photographing lens having a focal length shorter than $f_0$ is corrected to a value corresponding to a faster shutter speed than a value obtained according to $\log_2 f$, and the $T_{vf}$ for a photographing lens having a focal length longer than $f_0$ is corrected to a value corresponding to a slower shutter speed than a value obtained according to $\log_2 f$. Still further, on the basis of the $T_{vf}$ determined as described above, a program diagram appropriate to each photographing lens is determined.

Accordingly, not only an appropriate exposure but also a better quality image is obtained.

Still further, according to the exposure control device of the present invention, since an exposure control is carried out according to a program diagram starting from a shutter speed at which the effect of camera-shake is obviated, and enabling photographing with a long depth of field, not only an appropriate exposure but also an image having a better quality is obtained.

Although the embodiments of the present invention have been described herein with reference to the accompanying drawings, obviously many modifications and changes may be made by those skilled in this art without departing from the scope of the invention.

We claim:

1. An exposure control device of a camera, comprising:
   means for detecting a focal length f of a photographic lens attached to a camera body of said camera;
   means for calculating an exposure for obtaining a camera-shake limit shutter speed $T_{vf}$ according to said focal length f of said photographic lens, according to an equation $T_{vf}=(\log_2 f)\cdot\alpha+\beta$, wherein $\alpha<1$, and $\alpha$ and $\beta$ are constants satisfying an equation $\log_2 f_0 = (\log_2 f_0)\cdot\alpha+\beta$ for a predetermined focal length $f_0$.

2. An exposure control device of a camera, comprising:
   a photographic lens that is detachably mounted to a camera body, focal length information of said photographic lens being stored in a lens ROM provided in said photographic lens; and
   means for calculating an exposure for obtaining a camera-shake limit shutter speed $T_{vf}$ according to said focal length f of said photographic lens, according to an equation:

$T_{vf}=\log_2 f$, said exposure calculating means reading said focal length information from said lens ROM for an exposure calculation.

3. An exposure control device of a camera, comprising:
   a zoom lens, a focal length of said zoom lens being changed in accordance with a rotation of a zoom barrel, said zoom lens being detachably mounted to a camera body of said camera, said zoom lens comprising a code plate having a focal length code provided along a direction of movement of said zoom barrel corresponding to a stop position of said zoom barrel, and means for reading said focal length code when said zoom barrel is stopped; and
   means for calculating an exposure for obtaining a camera-shake limit shutter speed $T_{vf}$ according to a focal length f of said zoom lens, according to an equation:

$T_{vf}=\log_2 f$, said exposure calculating means taking in said focal length code read by said code reading means for an exposure calculation.

4. An exposure control device of a camera, comprising:
   a zoom lens, comprising:
      a code plate having a focal length code provided along a direction of movement of a zoom barrel; and
      means for reading said focal length code when said zoom barrel is stopped, a focal length f of said zoom lens being changed in accordance with a rotation of a zoom barrel associated with said zoom lens, said zoom lens being detachably mounted to a camera body of said camera; and
   means for calculating an exposure for obtaining a camera-shake limit shutter speed $T_{vf}$ according to a focal length f read by said code reading means of said zoom lens, according to an equation:

$T_{vf}=\log_2 f$, wherein said focal length code read by said code reading means is provided to said exposure calculating means through a contact between lens electric contacts provided in said zoom lens and body electric contacts provided in said camera body.

5. An exposure control device of a camera, comprising:
   a zoom lens, comprising:
      a code plate having a focal length code provided along a direction of movement of a zoom barrel; and
      means for reading said focal length code when said zoom barrel is stopped, a focal length f of said zoom lens being changed in accordance with a rotation of a zoom barrel associated with said zoom lens, said zoom lens being detachably mounted to a camera body of said camera, wherein said zoom code plate is fixed to a barrel which is formed of an insulating material, and which faces said zoom barrel along the direction of movement of said zoom barrel, said focal length code formed on said zoom code plate having wiring patterns formed by electric conductors insulated from each other, one end of said wiring patterns being connected to a plurality of input ports of a lens ROM, each wiring pattern having a narrow width portion and a wide width portion to obtain predetermined focal length information by a combination of said narrow width and wide width portions, in a direction perpendicular to a direction of movement of said zoom barrel, said code reading means having brushes provided with a plurality of contacts which can be independently slidably contacted with said wide width portions without coming into contact with said narrow width portions of each of said wiring patterns, said contacts being fixed to said zoom barrel, whereby a constant voltage is applied to a portion between said brushes and said wiring patterns, so that said lens ROM senses a voltage of each of said wiring patterns to output focal length information corresponding to the voltage of each of said wiring patterns; and
   means for calculating an exposure for obtaining a camera-shake limit shutter speed $T_{vf}$ according to a focal length f read by said code reading means of said zoom lens, according to an equation:

$T_{vf}=\log_2 f$.

6. An exposure control device of a camera, comprising:
   a photographic lens that is detachably mounted to a camera body, focal length information of said photographic lens being stored in a lens ROM provided in said photographic lens; and
   means for calculating an exposure for obtaining a camera-shake limit shutter speed $T_{vf}$ according to said focal length f of said photographic lens, according to an equation:
   $T_{vf}=\log_2 f$, said exposure calculating means reading said focal length information from said lens ROM for an exposure calculation, wherein said focal length information of said lens ROM is provided to said exposure calculating means through a contact between lens electric contacts provided in said photographic lens and body electric contacts provided in said camera body.

7. An exposure control device of a camera according to claim 5, wherein two pairs of said zoom code plate and said brush are provided at different positions.

8. An exposure control device for use in a camera, comprising:
   means for setting a camera-shake shutter speed $T_{vf}$;
   first calculating means for changing at least a shutter speed $T_v$ in accordance with an object luminance $E_v$ by a predetermined first program diagram when a shutter speed $T_v$ is smaller than said camera-shake limit shutter speed $T_{vf}$ set by said camera-shake limit setting means:
   second calculating means for shifting an aperture value $A_v$ so as to be stopped down by a constant value corresponding to a predetermined object luminance, while fixing said shutter speed $T_v$ to said camera-shake limit shutter speed $T_{vf}$ when said shutter speed $T_v$ is equal to said camera-shake limit shutter speed $T_{vf}$; and
   third calculating means for changing said aperture value $A_v$ and said shutter speed $T_v$ in accordance with said object luminance $E_v$ by a predetermined second program diagram after said aperture value $A_v$ is shifted and said camera-shake shutter speed $T_{vf}$ is fixed by said second calculating means.

9. An exposure control device for use in a camera, comprising:
   means for setting a camera-shake shutter speed $T_{vf}$
   first calculating means for changing at least a shutter speed $T_v$ in accordance with an object luminance $E_v$ by a predetermined first program diagram when a shutter speed $T_v$ is smaller than said camera-shake limit shutter speed $T_{vf}$ set by said camera-shake limit setting means;
   second calculating means for shifting an aperture value $A_v$ so as to be stopped down by a constant value corresponding to a predetermined object luminance, while fixing said shutter speed $T_v$ to said camera-shake limit shutter speed $T_{vf}$ when said shutter speed $T_v$ is equal to said camera-shake limit shutter speed $T_{vf}$ and
   third calculating means for changing said aperture value $A_v$ and said shutter speed $T_v$ in accordance with said object luminance $E_v$ by a predetermined second program diagram after said aperture value $A_v$ is shifted and said camera-shake shutter speed $T_{vf}$ is fixed by said second calculating means, wherein said camera-shake limit shutter speed $T_{vf}$ is obtained by an equation $T_{vf} = \log_2 f$, wherein f is a focal length of a photographic lens associated with said camera.

10. An exposure control device for use in a camera, comprising:
    means for setting a camera-shake shutter speed $T_{vf}$
    first calculating means for changing at least a shutter speed $T_v$ in accordance with an object luminance $E_v$ by a predetermined first program diagram when a shutter speed $T_v$ is smaller than said camera-shake limit shutter speed $T_{vf}$ set by said camera-shake limit setting means:
    second calculating means for shifting an aperture value $A_v$ so as to be stopped down by a constant value corresponding to a predetermined object luminance, while fixing said shutter speed $T_v$ to said camera-shake limit shutter speed $T_{vf}$ when said shutter speed $T_v$ is equal to said camera-shake limit shutter speed $T_{vf}$
    third calculating means for changing said aperture value $A_v$ and said shutter speed $T_v$ in accordance with said object luminance $E_v$ by a predetermined second program diagram after said aperture value $A_v$ is shifted and said camera-shake shutter speed $T_{vf}$ is fixed by said second calculating means; and
    exposure calculating means for obtaining said camera-shake limit shutter speed $T_{vf}$ by an equation $T_{vf} = (\log_2 f) \cdot \alpha + \beta$, according to the focal length of said photographic lens, wherein $\alpha < 1$, and $\alpha$ and $\beta$ are constants which are set to satisfy $\log_2 f_0 = (\log_2 f_0) \cdot \alpha + \beta$ for a predetermined focal length $f_0$.

11. An exposure control device of a camera according to claim 8, wherein said first calculating means changes said shutter speed $T_v$ to said camera-shake limit shutter speed $T_{vf}$ with the same aperture value $A_v$, according to the object luminance obtained by said predetermined first program diagram.

12. An exposure control device of a camera according to claim 8, wherein said second calculating means changes the aperture value $A_v$ so as to be stopped down to an open aperture value $A_{vmin}$ by said object luminance $E_v$, while fixing said shutter speed $T_v$ to said camera-shake limit shutter speed $T_{vf}$, when said shutter speed $T_v$ is equal to said camera-shake limit shutter speed $T_{vf}$.

13. An exposure control device of a camera according to claim 8, wherein said third calculating means changes both said aperture value $A_v$ and said shutter speed $T_v$ according to said object luminance $E_v$ obtained by said predetermined second program diagram.

14. An exposure control device of a camera according to claim 8, wherein said photographing lens is detachably mounted to said camera body, and focal length information of said photographing lens is stored in a lens ROM provided in said photographing lens, and said exposure calculating means reads said focal length information from said lens ROM for an exposure calculation.

15. An exposure control device of a camera according to claim 8, wherein said photographing lens is a zoom lens in which the focal length is changed in accordance with rotation of a zoom barrel, said photographing lens being detachably mounted to a camera body, said zoom lens comprising a code plate having a focal length code provided along a direction of movement of said zoom barrel, corresponding to a stop position of said zoom barrel, and code reading means for reading said focal length code corresponding to said stop position when movement of said zoom barrel is stopped, said exposure calculating means taking in said focal length code position read by said code reading means for an exposure calculation.

16. An exposure control device of a camera according to claim 15, wherein said focal length code position read by said code reading means is taken in to said exposure calculating means through a contact between lens electric contacts provided on said photographing lens and body electric contacts provided on said camera body.

17. An exposure control device of a camera according to claim 15, wherein said zoom code plate is fixed to a barrel formed by an insulating material, facing said barrel along the direction of movement of said zoom barrel, said focal length code formed on said zoom code plate having wiring patterns formed by electric conductors insulated from each other, one end of said wiring patterns being connected to a plurality of input ports of said lens ROM, each wiring pattern having a narrow width portion and a wide width portion to obtain predetermined focal length information by a combination of said narrow width portion and said wide width portion in a direction perpendicular to a direction of movement of said zoom barrel, said code reading means being provided with brushes having a plurality of contacts which are independently in slidable contact with said wide width portions without coming into contact with said narrow width portion of each wiring pattern, and are fixed to said zoom barrel, whereby a constant voltage is applied to a portion between said brushes and said wiring patterns, so that said lens ROM reads said focal length code position according to a change of each of said wiring patterns.

18. An exposure control device of a camera according to claim 14, wherein said focal length information of said lens ROM is taken in to said exposure calculating means through a contact between lens electric contacts provided in said photographing lens and body electric contacts provided in said camera body.

19. An exposure control device of a camera according to claim 17, wherein two pairs of said zoom code plate and said brush are provided at different positions.

* * * * *

UNITED STATES PATENT AND TRADEMARK OFFICE
CERTIFICATE OF CORRECTION

PATENT NO. : 4,978,981
DATED : December 18, 1990
INVENTOR(S) : Osamu SATOH et al.

It is certified that error appears in the above-indentified patent and that said Letters Patent is hereby corrected as shown below:

At column 17, line 8 (claim 8, line 3), change "$T_{v\varepsilon}$," to ---$T_{v\varepsilon}$;---.

At column 17, line 21 (claim 8, line 16), change "$T_{v\varepsilon}$," to ---$T_{v\varepsilon}$;---.

Signed and Sealed this

Seventeenth Day of January, 1995

Attest:

BRUCE LEHMAN

*Attesting Officer*  *Commissioner of Patents and Trademarks*